Patented Oct. 28, 1924.

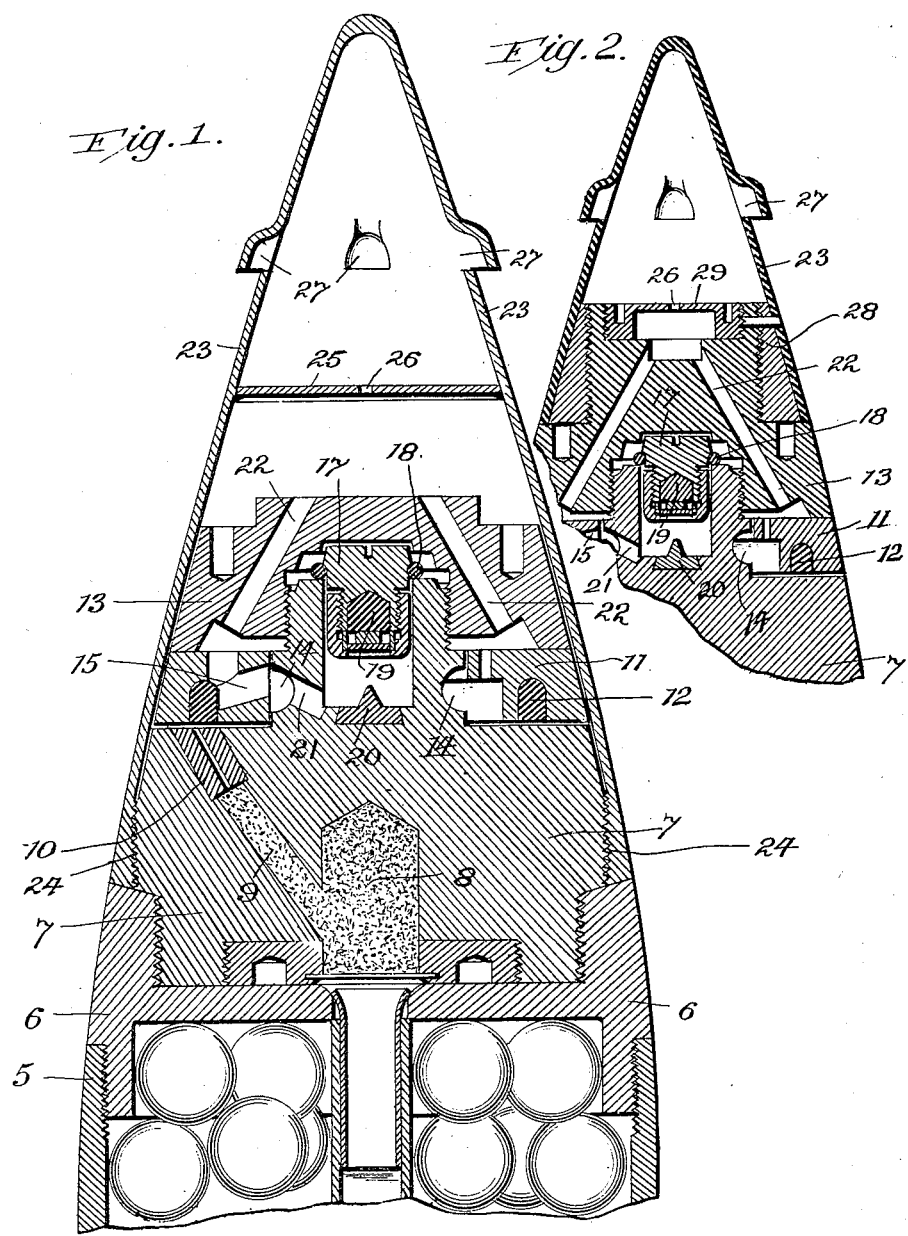

1,513,411

UNITED STATES PATENT OFFICE.

ALTEN S. MILLER, OF BALTIMORE, MARYLAND.

ART OF CONTROLLING TIME POWDER TRAINS.

Application filed January 9, 1924. Serial No. 685,229.

*To all whom it may concern:*

Be it known that I, ALTEN S. MILLER, a citizen of the United States, residing at Baltimore, in the State of Maryland, have invented certain new and useful Improvements in the Art of Controlling Time Powder Trains, of which the following is a specification.

This invention relates to the art or method of controlling the burning rate of time powder trains.

Such trains are extensively used in shells, projectiles, bombs, grenades and the like, any of which may be used at low or high altitudes, and some of which may be fired from low to high altitudes, as in the case of high angle long range artillery fire and anti-aircraft artillery fire. Changes of atmospheric pressure incident to such changes of altitude, and other similar causes, seriously affect the rate of burning of the time trains, and, particularly in the case of high velocity projectiles, cause serious errors in the time and hence in the position of the burst.

In my prior patents, Nos. 1,453,718 and 1,453,717, I describe a method of and means for overcoming this difficulty by the use of a pressure regulating discharge valve which controls the escape of products of combustion and operates to maintain a substantially constant pressure on the burning powder train. The present invention is subordinate to, but in the nature of an improvement on, my prior inventions above identified, and involves the practical application of a known law of the rate of flow of gases through fixed orifices, in such manner as permits the substitution of a simple fixed orifice for the pressure regulating valve, formerly used.

Assume that a gas is discharged under a constant head pressure through a fixed orifice. The rate of flow will vary as an inverse function of the pressure on the discharge side of the orifice, provided this pressure be above a definite critical value, which, expressed as a fraction of the head pressure, is a constant for the particular gas. Below the critical value changes of pressure on the discharge side do not affect the rate of flow.

To take advantage of this phenomenon, I so coordinate the train and a fixed vent orifice that the train burns under a constant absolute pressure, which is so related to the maximum atmospheric pressure that all variations in atmospheric pressure occur below the critical value and hence have no effect upon the rate of flow through the vent orifice. These conditions can be attained by keeping the analysis of the power uniform and so designing the train that uniform amounts of powder are burned in uniform increments of time, for under these conditions the power gases are evolved at a uniform rate, and flowing at a uniform rate through the fixed orifice maintain a constant pressure on the train.

To illustrate by a concrete example, the critical value for carbon dioxide and air is reached when the pressure in the discharge side is 52% of the head pressure. In other words, under constant head pressure the reduction of discharge side pressure below 52% of the head pressure will not increase the rate of flow through a fixed orifice. Thus, with a constant head pressure of 30 pounds per square inch, absolute, variations of discharge side pressure below 15.6 pounds per square inch, absolute, will not affect the rate of flow. Since all atmospheric pressures are below the latter value, a fuse which evolved carbon dioxide at a uniform rate when burning could be caused to burn under a constant pressure of 30 pounds per square inch, absolute, by the use of a proper fixed orifice.

Preferred embodiments of the invention are shown in the accompanying drawing, in which:

Fig. 1 is an axial section of the forward portion of a shrapnel shell constructed according to the present invention.

Fig. 2 is a similar view showing a modified construction.

A part of the casing of the shell appears at 5 and is closed at its forward end by a plug 6 threaded therein. The body 7 of the fuse is threaded into the forward side of the plug 6 and is provided with the usual chamber for the magazine charge 8 to which leads the usual passage 9 containing the ignition pellet 10. The time ring 11, provided with power train 12, is swiveled on the forward portion of the body 7 and is retained thereon by the cap 13. A groove 14 and port 15 provide for the transfer of flame to train 12 from the concussion primer hereafter described, in any position of the time ring.

Mounted in the forward end of the body 7 is a concussion plunger 17, which is retained by the usual resistance ring 18. This carries the usual concussion primer 19 and when released from said ring by the concussion of firing the shell, the concussion primer is fired by the firing pin 20. When so fired, it serves to ignite the powder train 12 through the passage 21, groove 14, and port 15. The ports 22 are vent ports for the powder gases.

All the parts so far described will be recognized as conforming in their broad general aspects with standard practice and as these parts are functionally similar in the structure of Fig. 1 and Fig. 2, they are given the same reference numerals in both figures.

The two structures differ merely in the way the false cap or nose is mounted on the shell, and in the way in which the fixed vent port is mounted.

Referring first to Fig. 1, the shell is provided with a false nose 23, which is threaded at 24 onto the body 7 of the fuse, at the rear of the time ring 11. Obviously, it must be removed to set the time ring. Forward of the cap 13 of the shell, the false nose 23 carries a diaphragm 25 brazed, welded or otherwise suitably fixed in position, and provided with a central vent orifice 26. Beyond the diaphragm 25 the false nose 23 is provided with vent passages 27.

The orifice 26 is the fixed orifice which operates to maintain a constant gas pressure on the burning fuse in the manner already described.

The structure of Fig. 1 obviously requires the removal of the false nose 23 to permit setting of the time ring. It has the advantage, however, that leakage of powder gases around the time ring cannot occur to the atmosphere directly, but is controlled by the orifice 26.

Turning now to Fig. 2, the false nose 23 is provided with vent ports 27, as before, but instead of being threaded on the body 7 of the fuse, is fixed to a ring 28 which is threaded onto the forward end of the cap 13. In this detail it conforms to the structure of my prior patents above referred to, and like the structures of those patents, gives direct access to the time ring without removal of the false nose.

Instead of using the diaphragm 25 mounted in the false nose, the structure of Fig. 2 is preferably provided with a diaphragm 29, which carries the fixed vent port 26, and which is threaded into the forward end of the cap 13 in such a way that the port 26 controls the discharge of powder gases from the vent ports 22.

The operation of the device, so far as the concussion plunger, time ring, and time trains are concerned, is familiar to those skilled in the art and need not be further described. The area of the port 26 is so chosen, relatively to the rate of burning of the time train, and the nature of the gases evolved by such train, as to maintain on that train a constant gas pressure by reason of the action heretofore described.

As stated, uniformity of composition of the powder in the time trains and the consumption of uniform quantities of powder in uniform increments of time are important factors in the maintenance of the constant pressure condition sought.

What is claimed is:

1. The method of controlling the burning rate of time powder trains in fuses, which consists in so designing the train that it will evolve powder gases at a constant quantity rate, and discharging the evolved gases through a fixed orifice whose area is such as to exert a back pressure on said gases so related to atmospheric pressures that all variation in the latter are below the critical value characteristic of such powder gases.

2. The method of controlling the burning rate of time trains in fuses, which consists in so determining the composition and form of the train that under substantially uniform pressure it will evolve powder gases at a substantially uniform quantity rate, and so coordinating the effective size of the vent for such gases with the rate of gas evolution, that the back pressure exerted on the gases by the vent is in such ratio to the maximum atmospheric pressure that variations of atmospheric pressure exert no effect on the rate of flow through the vent.

3. The combination with a fuse having a time powder train, of a constant area throttling orifice controlling the discharge of powder gases evolved by said train, and dimensioned and arranged to exert a constant back pressure thereon.

4. The combination with a fuse having a time powder train designed to evolve powder gases at a uniform quantity rate, of a constant area throttling orifice controlling the discharge of gases evolved by said train, and dimensioned and arranged to exert a constant back pressure thereon.

In testimony whereof I have signed my name to this specification.

ALTEN S. MILLER.